United States Patent Office 2,744,142
Patented May 1, 1956

2,744,142

REDUCTION PROCESS

William Oroshnik, Plainfield, N. J., assignor to Ortho Pharmaceutical Corporation, a corporation of New Jersey No Drawing. Application August 8, 1952, Serial No. 303,427

4 Claims. (Cl. 260—611)

This invention relates to a process for reducing to an ethylenic bond an acetylenic bond conjugated with an ethylenic bond. The system in a carbon chain of an ethylenic bond conjugated with an acetylenic bond is designated hereafter as a conjugated en-yne. This invention particularly relates to a method for reducing the acetylenic bond in a conjugated en-yne to an ethylenic bond by means of a suspension of chromous hydroxide in a basic or neutral medium.

Reduction of an acetylenic bond to an ethylenic bond in a compound having a conjugated en-yne has generally been accomplished heretofore by catalytic hydrogenation but this method of reduction has not been particularly satisfactory because if the reduction is not stopped when one mole proportion of hydrogen has been added per mole proportion of conjugated en-yne, the acetylenic bond and the ethylenic bond will be reduced to single bonds. It is therefore necessary, when catalytic hydrogenation is used, to carefully measure and control the amount of hydrogen taken up in the reduction in order that the reduction be stopped when the acetylenic bond has been reduced to an ethylenic bond. Even with all these precautions, the catalytic hydrogenation of a conjugated en-yne is still unsatisfactory because of the tendency for hydrogen to add 1,4 to the conjugated system.

Chromous salts in acid solution have been used for the reduction of compounds having acetylenic bonds or compounds having ethylenic bonds not conjugated with other ethylenic bonds. Fumaric and maleic acids have been reduced to succinic acid by the use of chromous salts in acid solution but cinnamic acid is not successfully reduced by this reagent. Cinnamic acid has been reduced by adding it in alkaline solution to a suspension of chromous hydroxide. Sodium phenylpropiolate has also been successfully reduced to hydrocinnamic acid in the same manner. A weakly acid solution of chromous sulfate has been used in the reduction of vinyl acetylene to butadiene. Diacetylene has been reduced in an aqueous solution of a compound of divalent chromium in the presence of a substance furnishing hydrogen by interaction with the chromous compounds.

It has now been discovered that the acetylenic bond of a compound having the following formula:

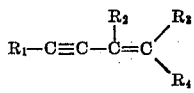

in which each of $R_1$, $R_2$, $R_3$ and $R_4$ may be hydrogen or an alkyl, aryl, aralkyl, or alkaryl radical; is reduced to an ethylenic bond by a suspension of chromous hydroxide in an alkaline or neutral medium. It is necessary that a compound having an active hydrogen, such as water or an alcohol, be one of the components of the medium.

The pH of the medium may be 7 and higher, but it is preferred that the pH be from 7 to 10. The medium may be made alkaline with a hydroxide of an alkali metal or an alkaline earth metal. It is preferred that the medium be made alkaline with sodium hydroxide.

The chromous hydroxide which is used, should be freshly prepared and precautions should be taken during the course of the reaction to exclude the oxygen of the air from contact with the reaction mixture.

It is preferred that the chromous hydroxide used in these reductions be prepared in situ and a satisfactory method for its preparation is to add a chromous salt such as chromous chloride, chromous sulfate, or chromous acetate to a solution of alkali, or vice versa. The chromous salt may be added as a dry solid, as a solution in water or some other appropriate medium, or as a wet paste. Chromous acetate is the preferred salt since it is the most stable and most easily handled. Chromous hydroxide may be formed in the presence of the compound to be reduced or may be first formed in the reaction medium; in the latter case, the compound to be reduced is added later. Another variation is to mix the chromous salt with material to be reduced and then add alkali to this mixture. Since the reducing action of chromous hydroxide may be used without any deleterious effect, the use of a large excess is preferred to insure complete reduction of the acetylenic bond to an ethylenic bond and the maximum yield of diene.

It has been found that a reduction made according to this invention will not reduce the acetylenic bond in the above class of compounds beyond an ethylenic bond and that no 1,4 addition of hydrogen to the conjugated system occurs. Reduction by this method proceeds smoothly, the product is relatively pure and is obtained in high yields.

Compound I having the formula

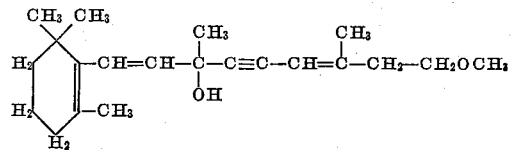

was prepared as follows: A solution of 13.6 grams of 1-methoxy-3-methyl-3-hexene-5-yne in 250 ml. of dry ether was treated with two per cent excess of ethereal ethyl magnesium bromide. After refluxing for 15 hours, the mixture was cooled and a solution of 23.3 grams of β-ionone in 50 ml. of ether was slowly added. The mixture was stirred for 15 hours at room temperature and hydrolyzed with ammonium acetate solution. The ether layer was removed, dried, and concentrated. The product was then distilled at 0.001 mm. of mercury pressure and the fraction distilling at 115°–130° C. was collected. 20.0 grams of a yellow viscous oil were obtained having a refractive index at 20° C. of 1.5212, and showing absorption in the ultraviolet was a maximum of 2350 A. and a molecular coefficient of extinction at that wavelength of 19,500. Compound I has a theoretical value for carbon of 79.69%, 10.19% for hydrogen, and 9.81% for methoxyl; 79.59% carbon, 9.94% hydrogen, and 9.72% methoxyl were found.

EXAMPLE I

Reduction of Compound I

A solution of 17.4 g of sodium hydroxide in 20 ml. of water was added to a cooled solution of 6.5 g. of Compound I in 100 ml. of ethanol. A wet aqueous paste of chromous acetate containing 30 g. of the salt was added to this mixture with stirring and moderate cooling. 50 ml. of methanol was used to wash the salt into the mixture. The chromous hydroxide precipitated as a brownish black to brownish purple gelatinous mass and the mixture was stirred under nitrogen at room temperature for about three days, diluted with ether and filtered. The filtrate was washed thoroughly with water and the ether layer was separated, dried, and concentrated. The concentrate was distilled at 0.001 mm. of mercury pressure and yielded 6.1 grams of a compound distilling at 110°–115° C. and having the formula

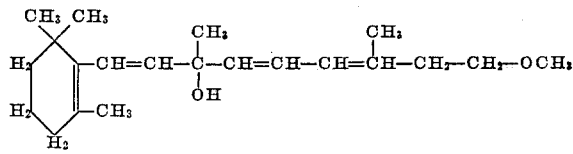

The distilled product had a refractive index at 20° C. of 1.5266 and showed absorption in the ultraviolet with a maximum of 2435 A. and a molecular coefficient of extinction at that wavelength of 24,000. The product had a calculated value for carbon of 79.19%, 10.76% hydrogen, and 9.74% methoxyl; 79.08% carbon, 10.67% hydrogen, and 9.54% methoxyl were found.

Compound II, having the formula

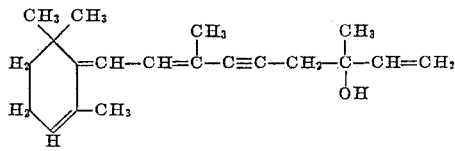

may be prepared by allylically rearranging and dehydrating the β-ionol group in the glycol having the formula

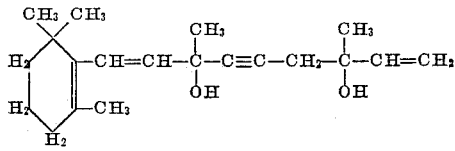

A solution of 25 g. of this glycol in 600 ml. of glacial acetic acid containing 10% of anhydrous potassium acetate was allowed to stand under nitrogen at room temperature for one day. It was then poured into water and the precipitated oil was taken up with petroleum ether. After drying and concentrating the petroleum ether solution, the product was distilled at 0.001 mm. of mercury pressure. The fraction distilling at 120°–130° C. had a refractive index at 23° C. of 1.5830 and showed absorption in the ultraviolet with a maximum of 3110 A. and a molecular coefficient of extinction at that wavelength of 35,000. The product had a calculated value for carbon of 84.45% and 9.92% for hydrogen; 84.25% carbon and 9.94% hydrogen were found.

EXAMPLE II

Reduction of Compound II

A 10.2-gram sample of Compound II was added to a solution of 22.3 grams of sodium hydroxide in 150 ml. of 33% aqueous ethanol. A wet aqueous paste of chromous acetate containing 14 grams of the salt was added, using methanol to wash it in. The total volume of the purple reaction mixture was 350–400 ml. After stirring under nitrogen for two days, the color was bright green. The product, having the formula

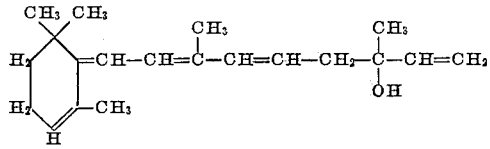

was isolated from the reaction mixture by the isolation method described in Example I. 7.5 grams of a product distilling at 110°–125° C. and 0.001 mm. of mercury pressure were obtained. The distilled product had a refractive index at 22.5°C. of 1.5770 and showed absorption in the ultraviolet with a maximum of 2990 A. and a molecular coefficient of extinction at that wavelength of 25,000. The product had a calculated value for carbon of 83.86% and 10.56% for hydrogen; 83.90% carbon and 10.53% hydrogen were found.

Compound III having the formula

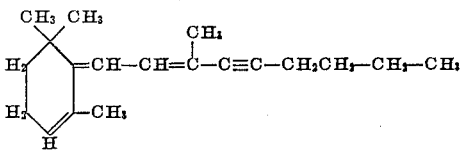

was prepared by allylically rearranging and dehydrating 1-hexynyl-β-ionol, having the formula

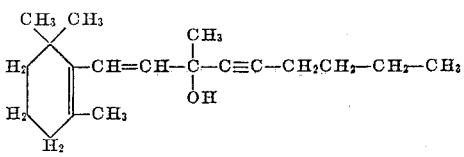

A solution of 19.2 grams of β-ionone in 50 ml. of ether was added to a solution of 0.1 mole of hexynyl magnesium bromide in 300 ml. of ether. After refluxing for one hour, the solution was cooled and hydrolyzed with ammonium acetate solution. The product, after it had been isolated from the reaction mixture, was distilled at 0.003 mm. of mercury pressure and the fraction distilling at 100°–104° C. was collected. The distilled product had a refractive index at 20° C. of 1.5004. The product had a calculated value for carbon of 83.15% and 11.02% for hydrogen; 82.80% carbon and 11.07% hydrogen were found.

A solution of 15.0 grams of 1-hexynyl-β-ionol in 150 ml. of glacial acetic acid containing 75 mg. of p-toluenesulfonic acid was allowed to stand under nitrogen at room temperature for one day. The reaction mixture was then poured into water and extracted with petroleum ether, washed with water, dried and distilled. 10.5 grams of Compound III distilling at 100°–110° C. at 0.001 mm. of mercury pressure were obtained. The distilled product had a refractive index at 20° C. of 1.5682 and showed absorption in the ultraviolet with a maximum of 3090 A. and a molecular coefficient of extinction at that wavelength of 35,600. The product had a calculated value for carbon of 89.03%, and 10.97% for hydrogen; 88.85% carbon and 11.01% of hydrogen were found.

EXAMPLE III

Reduction of Compound III

A 5.0-gram quantity of Compound III was reduced in the manner described above for Examples I or II. There were obtained on distillation at 93°–102° C. and 0.002 mm. of mercury pressure, 4.9 grams of a compound having the formula

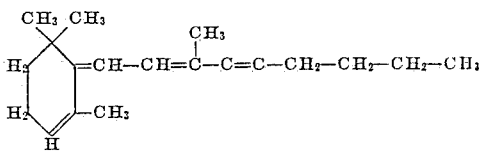

The distilled product had a refractive index at 20° C. of 1.5544 and showed absorption in the ultraviolet with a maximum of 2970 A. and a molecular coefficient of extinction at that wavelength of 2,300. The product had a calculated value for carbon of 88.30% and 11.70% for hydrogen; 87.99% carbon and 11.41% hydrogen were found.

EXAMPLE IV

Reduction of a compound having the formula

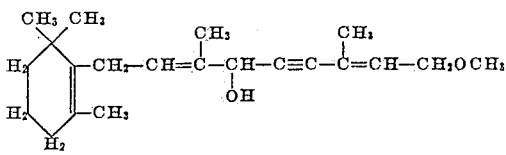

*Compound IV*

A wet cake of chromous acetate containing 34.5 grams of the salt was added with stirring to a solution of 17.5 grams of sodium hydroxide in 100 ml. of water. The precipitated chromous hydroxide was purple. Sufficient methanol was added to this suspension to bring the volume to 350 ml. A solution of 7.9 grams of Compound IV in 50 ml. of ethanol was then added to the above suspension and the mixture was stirred under nitrogen at room temperature for two days, diluted with ether, filtered and distilled after removal of the ether, at 0.002 mm. of mercury pressure. Seven grams of a reduction product having the formula

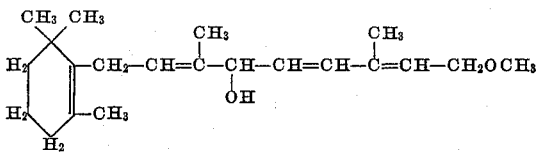

and distilling at 110°–118° C. were obtained. The distilled product had a refractive index at 22.5° C. of 1.5190, and a calculated value for carbon of 79.19%, 10.76% for hydrogen, and 9.74% for ethoxyl; 79.63% carbon, 10.74% hydrogen and 9.10% methoxyl were found.

Compound V having the formula

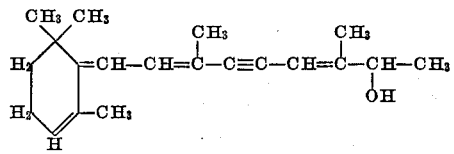

was prepared by the allylic rearrangement and dehydration of an acetylenic glycol, having the formula

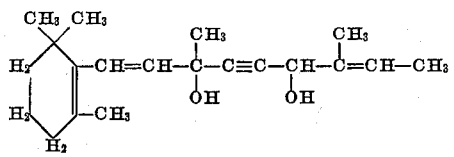

The glycol was prepared as follows: a solution of 21.8 grams of ethynyl-β-ionol in 100 ml. of dry ether was treated with 0.2 mole of ethylmagnesium bromide in 200 ml. of dry ether. The mixture was refluxed for one hour, cooled and a solution of 0.12 mole of freshly distilled tiglic aldehyde was added with stirring and cooling. After an hour of refluxing, the mixture was cooled and hydrolyzed with ammonium acetate solution. The ether solution was removed, the glycol was dried and concentrated to a syrup under vacuum.

The crude glycol was dissolved in 750 ml. of glacial acetic acid, the solution was allowed to stand under nitrogen for one day, and poured into water. The dehydration product was isolated by extraction of the aqueous mixture with petroleum ether, drying the solution and removing the ether. The dehydrated material was distilled at 0.001 mm. of mercury pressure and 26.3 g. of a product distilling at 125°–140° C. were obtained. The distilled product had a refractive index at 19.5° C. of 1.5975 and showed absorption in the ultraviolet with a maximum of 3330 A. and a molecular coefficient of extinction at that wavelength of 32,600. This product, which is the acetate of Compound V, had a calculated value for carbon of 80.93% and 9.26% for hydrogen; 80.91% carbon and 9.36% hydrogen were found. The acetate was allowed to stand in dilute aqueous alcoholic alkali for several hours at room temperature to obtain Compound V. Compound V was then isolated by extraction of the solution with ether, drying the ether solution, removal of the ether and distillation of the crude material under reduced pressure. The distilled product had a refractive index at 20° C. of 1.624 and showed absorption in the ultraviolet with a maximum of 3330 A. and a molecular coefficient of extinction at that wavelength of 30,300. The product had a calculated value for carbon of 84.45% and 9.92% for hydrogen; 84.30% carbon and 9.87% hydrogen were found.

EXAMPLE V

*Reduction of Compound V*

A 7.5 gram sample of Compound V was reduced in the manner described under Example I using four equivalents of chromous acetate. The reduction product was distilled at 0.001 mm. of mercury pressure. A 5.9 gram fraction distilling at 110°–120° C. had a refractive index at 20° C. of 1.5930 and a calculated value for carbon of 83.86% and 10.56% for hydrogen; 84.10% carbon and 10.64% hydrogen were found. The compound of this fraction had the formula

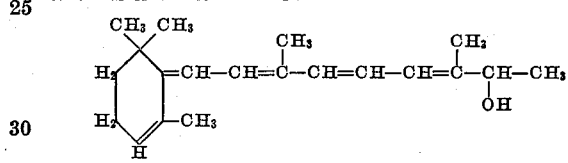

Since certain changes may be made in the reduction processes of the above examples and different embodiments of the invention could be made without departing from its scope, it is intended that all matter contained in the above examples and description is to be regarded as illustrative and not in a limiting sense.

What is claimed is:

1. A process for the reduction of a conjugated en-yne to a diene comprising: treating a compound of the formula

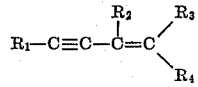

in which each of $R_2$ and $R_4$ may be selected from the class consisting of hydrogen and alkyl, aryl, aralkyl, and alkaryl radicals and in which $R_1$ and $R_3$ are selected from the group consisting of alkyl substituted cyclohexenyl alkenes, saturated and ethylenically unsaturated aliphatic hydrocarbons, and hydroxy and alkoxy derivatives of saturated and ethylenically unsaturated aliphatic hydrocarbons, with the proviso that one and only one of $R_1$ and $R_3$ is an alkyl substituted cyclohexenyl alkene; with a reducing reagent containing chromous hydroxide in suspension in a liquid medium containing a compound having an active hydrogen, the reducing reagent having a pH of at least 7.

2. A process according to claim 1 in which the pH of the reducing reagent is greater than 7.

3. A process according to claim 1 in which the compound having an active hydrogen is water.

4. A process according to claim 1 in which the compound having an active hydrogen is water and the pH of the reducing reagent is greater than 7.

No references cited.